US008033687B2

(12) United States Patent
Wang

(10) Patent No.: US 8,033,687 B2
(45) Date of Patent: Oct. 11, 2011

(54) WATERPROOF ASSEMBLY OF LED LAMP CUP

(75) Inventor: Pei-Choa Wang, Gueishan Township, Taoyuan County (TW)

(73) Assignee: Pyroswift Holding Co., Limited, East Wanchai (HK)

( * ) Notice: Subject to any disclaimer, the term of this patent is extended or adjusted under 35 U.S.C. 154(b) by 343 days.

(21) Appl. No.: 12/492,203

(22) Filed: Jun. 26, 2009

(65) Prior Publication Data

US 2010/0328960 A1 Dec. 30, 2010

(51) Int. Cl.
*F21V 29/00* (2006.01)
*B60Q 1/06* (2006.01)

(52) U.S. Cl. ........ 362/267; 362/800; 362/373; 362/645; 362/547; 362/294; 362/249.02

(58) Field of Classification Search .................. 362/218, 362/294, 373, 547, 267, 249.02, 645, 646, 362/101, 249.11, 264, 800
See application file for complete search history.

(56) References Cited

U.S. PATENT DOCUMENTS

| | | | | |
|---|---|---|---|---|
| 5,785,418 | A * | 7/1998 | Hochstein | 362/373 |
| 6,069,477 | A * | 5/2000 | Chen et al. | 324/303 |
| 2009/0109677 | A1 * | 4/2009 | Coushaine et al. | 362/267 |
| 2009/0257234 | A1 * | 10/2009 | Zheng et al. | 362/373 |
| 2009/0310363 | A1 * | 12/2009 | Liu et al. | 362/249.02 |

* cited by examiner

*Primary Examiner* — Anabel Ton
*Assistant Examiner* — Danielle Allen
(74) *Attorney, Agent, or Firm* — Chun-Ming Shih; HDLS IPR Services

(57) ABSTRACT

A LED lamp cup includes a heat-conducting substrate, a LED unit, a casing and a light-transmitting lamp cover. The casing can be detachably assembled with the heat-conducting substrate or the light-transmitting lamp cover easily. Further, the casing or the light-transmitting lamp cover is configured that it can be retained from outside toward inside, so that the casing may not rotated reversely after being assembled with the heat-conducting substrate or the light-transmitting lamp cover. Thus, the biasing force exerted on the first and second waterproof gaskets may not be reduced to enlarge the gap. Thus, the penetration of moisture can be prevented to achieve a good waterproof effect.

20 Claims, 3 Drawing Sheets

WATERPROOF ASSEMBLY OF LED LAMP CUP

BACKGROUND OF THE INVENTION

1. Field of the Invention

The present invention relates to a LED lamp, and in particular to a waterproof assembly of a LED lamp cup.

2. Description of Prior Art

Since light-emitting diodes (LED) have advantages of high brightness, low electricity consumption and long life, they have been widely used in various lamps so as to replace the traditional bulbs or lamp tubes. However, when the LED is used in a light source for an outdoor lamp, it is an important issue for the LED to be waterproof, thereby preventing against the penetration of moisture.

The conventional way of preventing against the penetration of moisture relies on a waterproof gasket disposed between two screw elements. In a word, the waterproof gasket is pressed between the lamp cup and a lamp holder. With the waterproof gasket blocking the gap between the lamp cup and the lamp holder, the effect of preventing against the penetration of moisture can be achieved. Further, via waterproof glue coating the outer periphery of the waterproof gasket, the effect of preventing against the penetration of moisture can be enhanced. However, such an arrangement leads to a problem that the whole lamp cup cannot be disassembled. As a result, if the LED in the lamp cup suffers damage in the future, it cannot be replaced.

Thus, in view of the possible replacement of damaged LED, the lamp cup has to be disassembled. The common waterproof gasket is fitted tightly within the gap between the lamp cup and the lamp holder via the mutual compression of the two associated screw elements, thereby achieving the effect of preventing against the penetration of moisture. However, if these two screw elements are rotated in a reverse direction so as to be loosened slightly, the tightness between these two screw elements is reduced and thus the gap there between is enlarged. Further, after these two screw elements are assembled/disassembled for several times, the gap may be enlarged further, so that the penetration of moisture becomes worse.

Therefore, in order to overcome the above problems, the present Inventor proposes a reasonable and novel structure based on his delicate researches and expert experiments.

SUMMARY OF THE INVENTION

The present invention is to provide a waterproof assembly of a LED lamp cup. With a retainer, the LED lamp cup can be detachably assembled with the lamp holder or the lamp cover easily. Via the retainer retaining from outside toward inside, the retainer cannot be rotated reversely. As a result, the biasing force exerted on the waterproof gasket may not be reduced to enlarge the gap. Thus, the penetration of moisture can be prevented, and the present invention can generate a good waterproof effect.

The present invention is to provide a waterproof assembly of a LED lamp cup, which includes a heat-conducting substrate, a LED unit, a casing and a light-transmitting lamp cover. One surface of the heat-conducting substrate is provided with an annular fixing base. The outer periphery of the distal end of the fixing base extends outwards to form a first outer annular protrusion. The top surface of the first outer annular protrusion has a first sealing surface. The first outer annular protrusion is provided with a plurality of troughs. The LED unit is located in the fixing base and comprises a circuit board adhered to the heat-conducting substrate and a plurality of light-emitting diodes provided on the circuit board. The casing has a hollow interior and two open ends. The edge of one end of the casing extends downwards to form an annular neck. The inner edge of the annular neck is formed with a first inner annular protrusion that protrudes inwards. The bottom surface of the first inner annular protrusion has a first sealing surface. The outer periphery of the distal end of the annular neck projects inwards to form a plurality of protruding blocks. Each of the protruding blocks corresponds to each of the troughs. A first pitch is formed between the protruding blocks and the first inner annular protrusion. The first outer annular protrusion is retained in the first pitch. A first waterproof gasket is provided between the first sealing surface of the first outer annular protrusion and the first sealing surface of the first inner annular protrusion. The light-transmitting lamp cover is provided on the other end of the casing.

The present invention is to provide a waterproof assembly of a LED lamp cup, which includes a heat-conducting substrate, a LED unit, a casing and a light-transmitting lamp cover. The LED unit comprises a circuit board adhered to the heat-conducting substrate and a plurality of light-emitting diodes provided on the circuit board. The casing has a hollow interior and two open ends. One end of the casing is provided on the heat-conducting substrate, and the other end extends outwards to form a second outer annular protrusion. The top surface of the second outer annular protrusion has a second sealing surface. The second outer annular protrusion is provided with a plurality of troughs. The light-transmitting lamp cover has a lens and a frame provided on the periphery of the lens. The inner edge of the frame is formed with a second inner annular protrusion that projects inwards. The bottom surface of the second inner annular protrusion has a second sealing surface. The outer periphery of the distal end of the frame is provided with a plurality of protruding blocks that protrude inwards. Each of the protruding blocks corresponds to each of the troughs. A second pitch is formed between the protruding blocks and the second inner annular protrusion. The second outer annular protrusion is retained in the second pitch. A second waterproof gasket is provided between the second sealing surface of the second outer annular protrusion and the second sealing surface of the second inner annular protrusion.

DETAILED DESCRIPTION OF THE INVENTION

In order to make the Examiner better understand the characteristics and technical contents of the present invention, a description relating thereto will be explained with reference to the accompanying drawings. However, the drawings are illustrative only but not used to limit the present invention.

Figure 1:
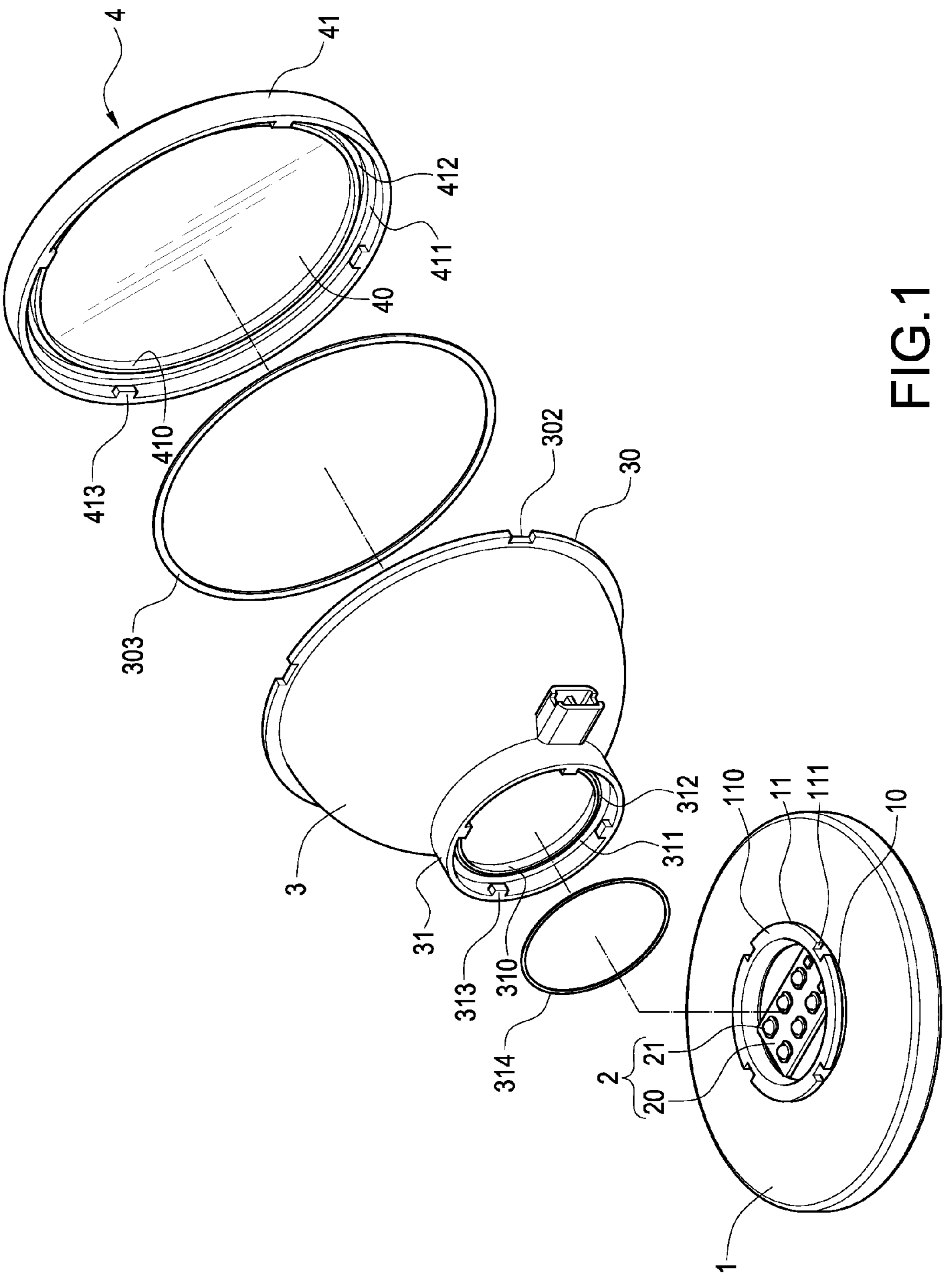
FIG. 1 is an exploded perspective view showing the external appearance of the present invention.
Figure 2:
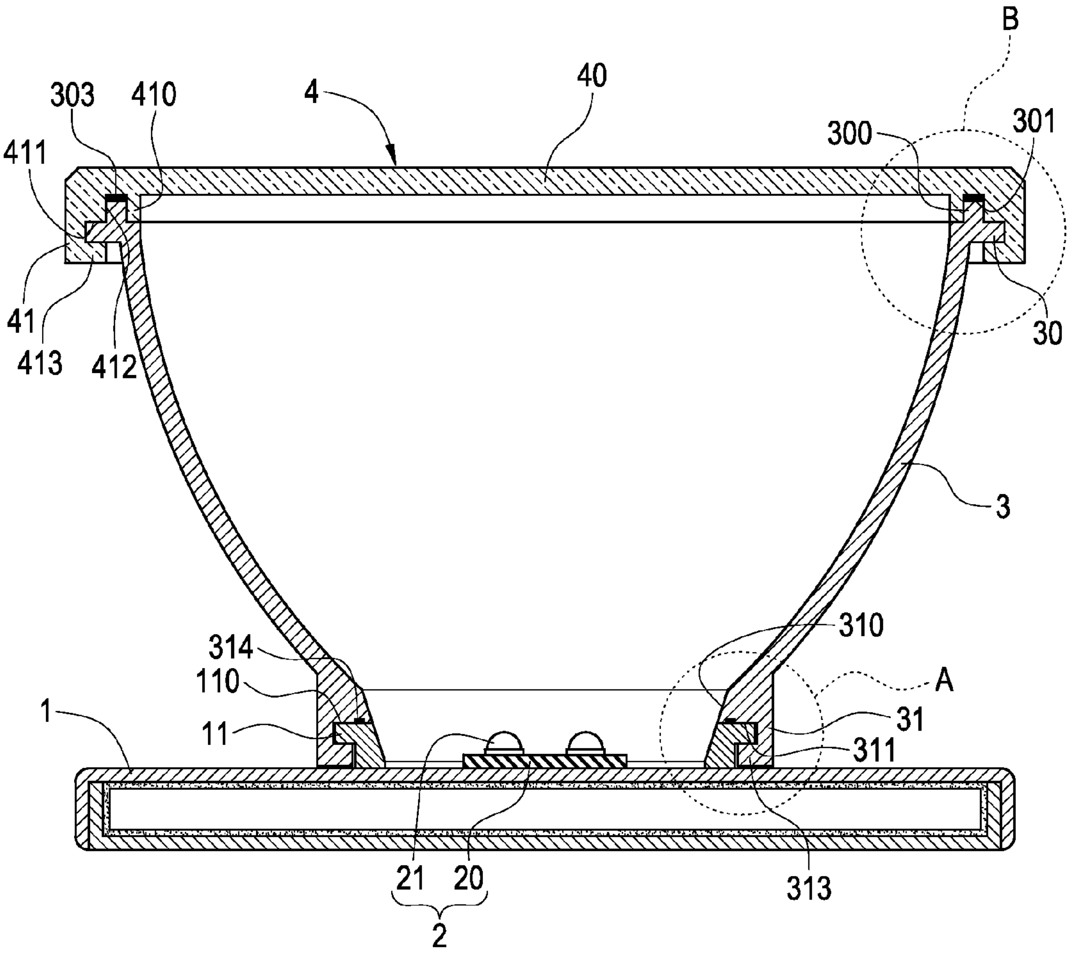
FIG. 2 is an assembled cross-sectional view of the present invention.

Please refer to FIGS. 1 and 2. FIG. 1 is an exploded perspective view showing the external appearance of the present invention, and FIG. 2 is an assembled cross-sectional view of the present invention. The present invention provides a waterproof assembly of a LED lamp cup, which includes a heat-conducting substrate 1, a LED unit 2, a casing 3 and a light-transmitting lamp cover 4. The LED 2 is adhered to the heat-conducting substrate 1. Via the heat-conducting substrate 1, the heat generated by the LED can be dissipated. The casing 3 covers the LED unit 2. One end of the casing 3 is assembled with the heat-conducting substrate 1, and the other end is assembled with the light-transmitting lamp cover 4. Via this arrangement, the light emitted by the LED unit 2 can be projected from the interior of the casing 3 toward the light-transmitting lamp cover 4. Thus, the light can be projected toward the outside of the casing 3.

The heat-conducting substrate 1 is a solid plate made of a metallic material having good heat conductivity such as aluminum or copper. Alternatively, the heat-conducting substrate 1 can be made as a vapor chamber in which a vacuum is generated and working fluid is filled. One surface of the heat-conducting substrate 1 to which the LED unit 2 is adhered is provided with an annular fixing base 10. The outer periphery of the distal end of the fixing base 10 extends outwards to form a first outer annular protrusion 11. The top surface of the first outer annular protrusion 11 has a first sealing surface 110. The first outer annular protrusion 11 is provided with a plurality of troughs 111 that are distributed uniformly. The troughs 111 allow the casing 3 to be detachably assembled therewith to be brought into a tight contact.

The LED unit 2 comprises a circuit board 20 and a plurality of light-emitting diodes 21 provided on the circuit board 20. According to the above, the LED unit 2 is adhered to the heat-conducting substrate 1, so that the circuit board 20 of the LED unit 2 is also adhered to the heat-conducting substrate 1 and located in the fixing base 10 of the heat-conducting substrate 1. Via the above arrangement, when the casing 3 is assembled with the fixing base 10, the casing 3 covers outside the LED unit 2.

Figure 3:
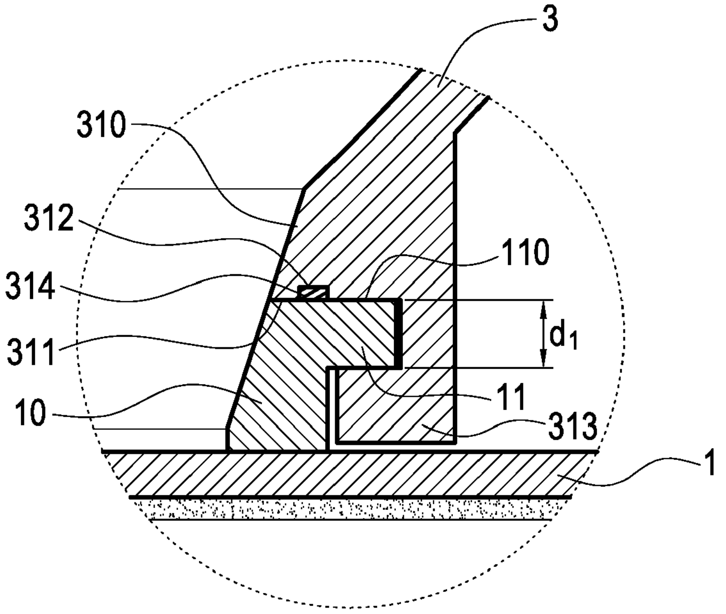
FIG. 3 is a partially enlarged view showing the details of the portion A in FIG. 2.

The casing 3 is formed into a cup. The casing 3 has a hollow interior and two open ends. One end of a smaller opening is assembled with the heat-conducting substrate 1. The other end of a larger opening is assembled with the light-transmitting lamp cover 4. Please also refer to FIG. 3. The edge of the smaller end of the casing 3 extends downwards to form an annular neck 31. The inner edge of the annular neck 31 is formed with a first inner annular protrusion 310 that protrudes inwards. The bottom surface of the first inner annular protrusion 310 has a first sealing surface 311. The first sealing surface 311 is provided with a groove 312. The outer periphery of the annular neck 31 protrudes inwards to form a plurality of protruding blocks 313 protruding inwards and distributed uniformly. The protruding blocks 313 correspond to the troughs 111 of the first outer annular protrusion 11 respectively. A first pitch $d_1$ is formed between the protruding block 313 and the first inner annular protrusion 310 (FIG. 3). The thickness of the first pitch $d_1$ is identical to that of the first outer annular protrusion 11. Via this arrangement, the protruding block 313 of the annular neck 31 can be fitted in the troughs 111 of the first outer annular protrusion 11, so that the first outer annular protrusion 11 can be retained in the first pitch $d_1$. The first sealing surface 110 of the first outer annular protrusion 11 is overlapped tightly with the first sealing surface 311 of the first inner annular protrusion 310. A first waterproof gasket 314 is disposed between both sealing surfaces 110 and 311 for providing a waterproof effect between the heat-conducting substrate 1 and the casing 3. The first waterproof gasket 314 can be pressed into the groove 312. Alternatively, the groove 312 can be located on the first sealing surface 110 of the first outer annular protrusion 11.

Furthermore, the edge of the larger end of the casing 3 extends outwards to form a second outer annular protrusion 30. An annular flange 300 is provided on the second outer annular protrusion 30. The top surface of the annular flange 300 forms a second sealing surface 301. Also, the second outer annular protrusion 30 is provided with a plurality of troughs 302 that are distributed uniformly for allowing the light-transmitting lamp cover 4 to be detachably assembled and brought into a tight contact therewith.

Figure 4:
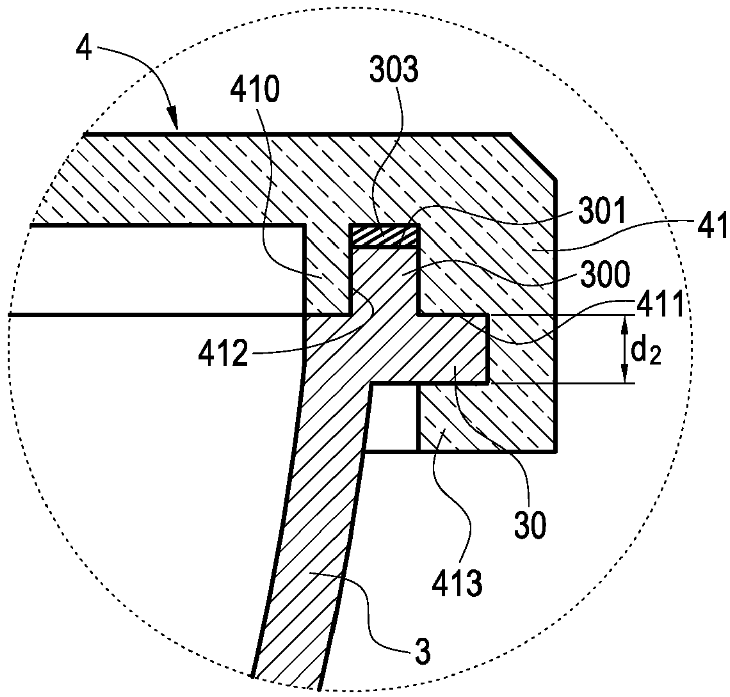
FIG. 4 is a partially enlarged view showing the details of the portion B in FIG. 2.

Please refer to FIGS. 1, 2 and 4. The light-transmitting lamp cover 4 covers the larger end of the casing 3. The light-transmitting lamp cover 4 has a lens 40 and a frame 41 provided on the periphery of the lens 40. The inner edge of the frame 40 is formed with a second inner annular protrusion 410 that protrudes inwards. The bottom surface of the second inner annular protrusion 410 also has a second sealing surface 411. The second sealing surface 411 is provided with a groove 412. The outer periphery of the distal end of the frame 41 is provided with a plurality of protruding blocks 413 protruding inwards and distributed uniformly. The protruding blocks 413 correspond to the troughs 302 on the second outer annular protrusion 30 of the casing 3. A second pitch $d_2$ is formed between the protruding block 413 and the second inner annular protrusion 410 (FIG. 4). The second pitch $d_2$ is identical to the thickness of the second outer annular protrusion 30. Via this arrangement, the protruding blocks 413 of the frame 41 can be fitted in the troughs 302 of the second outer annular protrusion 30, so that the second outer annular protrusion 30 is retained in the second pitch $d_2$. The annular flange 300 of the second outer annular protrusion 30 can be inserted into the groove 412 of the second inner annular protrusion 410. As a result, both sealing surfaces 301, 411 can be overlapped with each other tightly. A second waterproof gasket 303 is disposed between these two sealing surfaces, thereby generating a waterproof effect between the light-transmitting lamp cover 4 and the casing 3. At the same time, the second waterproof gasket 303 can be further pressed into the groove 412. Alternatively, the annular flange 300 can be located on the second sealing surface 410 of the second inner annular protrusion 410, so that the groove 412 can be located on the second sealing surface 110 of the second outer annular protrusion 30.

Via the above arrangement, the waterproof assembly of a LED lamp cup according to the present invention can be obtained.

Therefore, via the waterproof assembly of a LED lamp cup according to the present invention, the casing 3 can be detachably assembled with the heat-conducting substrate 1 or the light-transmitting lamp cover 4 easily. Via the annular neck 31 of the casing 3 or the frame 41 of the light-transmitting lamp cover 4 retaining from the outside toward the inside, the casing 3 may not be rotated reversely after being assembled with the heat-conducting substrate 1 or the light-transmitting lamp cover 4. Thus, the biasing force exerted on the first and second waterproof gaskets 314, 303 may not be reduced so as to enlarge the gap there between. Thus, the penetration of moisture can be prevented efficiently so as to achieve a good waterproof effect.

It should be noted that the casing can be detachably assembled with the heat-conducting substrate 1 only while still achieving the waterproof effect. The casing can be integrally formed with the light-transmitting lamp cover 4, so that the casing cannot be disassembled from the light-transmitting lamp cover. Alternatively, the casing can be detachably assembled with the light-transmitting lamp cover 4 only while still achieving the waterproof effect. The casing can be integrally formed with the heat-conducting substrate 1, so that the casing cannot be disassembled from the heat-conducting substrate 1. In other words, one of the heat-conducting substrate 1 and the light-transmitting lamp cover 4 cooperates with the casing 3 to generate a waterproof effect.

According to the above, the present invention really achieves the expected objects and solves the problems of prior art. Further, the present invention demonstrates novelty and inventive steps, which conforms to the requirements for a utility model patent.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A waterproof assembly of LED lamp cup, comprising;

a heat-conducting substrate with one surface thereof having an annular fixing base, an outer periphery of a distal end of the fixing base extending outwards to form a first outer annular protrusion, a top surface of the first outer annular protrusion having a first sealing surface, the first outer annular protrusion being provided with a plurality of troughs;

a LED unit located in the fixing base and comprising a circuit board adhered to the heat-conducting substrate and a plurality of light-emitting diodes provided on the circuit board;

a casing with a hollow interior and two open ends, an edge of one end of the casing extending downwards to form an annular neck, an inner edge of the annular neck being formed with a first inner annular protrusion projecting inwards, a bottom surface of the first inner annular protrusion having a first sealing surface, an outer periphery of a distal end of the annular neck being provided with a plurality of protruding blocks, the protruding blocks of the annular neck corresponding to the troughs of the first outer annular protrusion, a first pitch being formed between the protruding blocks and the first inner annular protrusion, the first outer annular protrusion being retained in the first pitch, a first waterproof gasket being disposed between the first sealing surface of the first outer annular protrusion and the first sealing surface of the first inner annular protrusion; and a light-transmitting lamp cover having a lens and a frame provided on a periphery of the lens, an inner edge of the frame being formed with a second inner annular protrusion protruding inwards, a bottom surface of the second inner annular protrusion having a second sealing surface, an outer periphery of a distal end of the frame being provided with a plurality of protruding blocks protruding inwards, a second pitch being formed between the protruding blocks of the frame and the second inner annular protrusion;

wherein the other end of the casing extends outwards to form a second outer annular protrusion, a top surface of the second outer annular protrusion having a second sealing surface, the second outer annular protrusion is provided with a plurality of troughs, the protruding blocks of the frame correspond to the troughs of the second outer annular protrusion, the second outer annular protrusion is retained in the second pitch, a second waterproof gasket being disposed between the second sealing surface of the second outer annular protrusion and the second sealing surface of the second inner annular protrusion.

2. The waterproof assembly of LED lamp cup according to claim 1, wherein the heat-conducting substrate is a solid plate.

3. The waterproof assembly of LED lamp cup according to claim 1, wherein the heat-conducting substrate is a vapor chamber in which a vacuum is generated and working fluid is filled.

4. The waterproof assembly of LED lamp cup according to claim 1, wherein the first sealing surface of the first outer annular protrusion is provided with a groove, the first waterproof gasket is pressed into the groove.

5. The waterproof assembly of LED lamp cup according to claim 1, wherein the second sealing surface of the second outer annular protrusion is provided with a groove, the second waterproof gasket is pressed in the groove of the second sealing surface of the second outer annular protrusion.

6. The waterproof assembly of LED lamp cup according to claim 5, wherein the second inner annular protrusion is provided with an annular flange, the top surface of the annular flange forms the second sealing surface of the second inner annular protrusion, the annular flange is inserted into the groove of the second outer annular protrusion.

7. The waterproof assembly of LED lamp cup according to claim 1, wherein the second sealing surface of the second inner annular protrusion is provided with a groove, the second waterproof gasket is pressed in the groove.

8. The waterproof assembly of LED lamp cup according to claim 1, wherein the first sealing surface of the first inner annular protrusion is provided with a groove, the first waterproof gasket is pressed in the groove.

9. A waterproof assembly of LED lamp cup, comprising;

a heat-conducting substrate with one surface thereof having an annular fixing base, an outer periphery of a distal end of the fixing base extending outwards to form a first outer annular protrusion, a top surface of the first outer annular protrusion having a first sealing surface, the first outer annular protrusion being provided with a plurality of troughs;

a LED unit located in the fixing base and comprising a circuit board adhered to the heat-conducting substrate and a plurality of light-emitting diodes provided on the circuit board;

a casing with a hollow interior and two open ends, an edge of one end of the casing extending downwards to form an annular neck, an inner edge of the annular neck being formed with a first inner annular protrusion projecting inwards, a bottom surface of the first inner annular protrusion having a first sealing surface, an outer periphery of a distal end of the annular neck being provided with a plurality of protruding blocks, the protruding blocks corresponding to the troughs, a first pitch being formed between the protruding blocks and the first inner annular protrusion, the first outer annular protrusion being retained in the first pitch, a first waterproof gasket being disposed between the first sealing surface of the first outer annular protrusion and the first sealing surface of the first inner annular protrusion; and a light-transmitting lamp cover provided on the other end of the casing.

10. The waterproof assembly of LED lamp cup according to claim 9, wherein the heat-conducting substrate is a solid plate.

11. The waterproof assembly of LED lamp cup according to claim 9, wherein the heat-conducting substrate is a vapor chamber in which a vacuum is generated and working fluid is filled.

12. The waterproof assembly of LED lamp cup according to claim 9, wherein the first sealing surface of the first outer annular protrusion is provided with a groove, the first waterproof gasket is pressed into the groove.

13. The waterproof assembly of LED lamp cup according to claim 9, wherein the first sealing surface of the first inner annular protrusion is provided with a groove, the first waterproof gasket is pressed into the groove.

14. A waterproof assembly of LED lamp cup, comprising;

a heat-conducting substrate;

a LED unit comprising a circuit board adhered to the heat-conducting substrate and a plurality of light-emitting diodes provided on the circuit board;

a casing with a hollow interior and two open ends, one end of the casing being provided on the heat-conducting substrate, the other end extending outwards to form a second outer annular protrusion, a top surface of the second outer annular protrusion having a second sealing surface, the second outer annular protrusion being provided with a plurality of troughs; and a light-transmitting lamp cover having a lens and a frame provided on a periphery of the lens, an inner edge of the frame being formed with a second inner annular protrusion protruding inwards, a bottom surface of the second inner annular protrusion having a second sealing surface, an outer periphery of a distal end of the frame being provided with a plurality of protruding blocks protruding inwards, the protruding blocks correspond to the troughs, a second pitch being formed between the protruding blocks and the second inner annular protrusion, the second outer annular protrusion being retained in the second pitch, a second waterproof gasket being disposed between the second sealing surface of the second outer annular protrusion and the second sealing surface of the second inner annular protrusion.

15. The waterproof assembly of LED lamp cup according to claim 14, wherein the heat-conducting substrate is a solid plate.

16. The waterproof assembly of LED lamp cup according to claim 14, wherein the heat-conducting substrate is a vapor chamber in which a vacuum is generated and working fluid is filled.

17. The waterproof assembly of LED lamp cup according to claim 14, wherein the second sealing surface of the second outer annular protrusion is provided with a groove, the second waterproof gasket is pressed into the groove on the second sealing surface of the second outer annular protrusion.

18. The waterproof assembly of LED lamp cup according to claim 17, wherein the second inner annular protrusion is provided with an annular flange, a top surface of the annular flange forms the second sealing surface of the second inner annular protrusion, the annular flange is inserted into the groove of the second outer annular protrusion.

19. The waterproof assembly of LED lamp cup according to claim 14, wherein the second sealing surface of the second inner annular protrusion is provided with a groove, the second waterproof gasket is pressed into the groove.

20. The waterproof assembly of LED lamp cup according to claim 19, wherein the second outer annular protrusion is provided with an annular flange, a top surface of the annular flange forms the second sealing surface of the second outer annular protrusion, the annular flange is inserted into the groove of the second inner annular protrusion.

* * * * *